United States Patent [19]

Mercer

[11] 4,044,925
[45] Aug. 30, 1977

[54] SCREW FEEDER FOR INJECTION MOLDING MACHINE

[75] Inventor: James R. Mercer, Akron, Ohio

[73] Assignee: McDowell-Wellman Engineering Co., Cleveland, Ohio

[21] Appl. No.: 677,520

[22] Filed: Apr. 16, 1976

[51] Int. Cl.² ............................................. B29B 5/06
[52] U.S. Cl. ................................. 222/263; 222/413; 425/448; 425/557
[58] Field of Search ................. 425/245 R, 244, 448; 222/252, 263, 413

[56] References Cited

U.S. PATENT DOCUMENTS

| 2,359,840 | 10/1944 | Goesslling | 425/244 UX |
| 2,493,805 | 1/1950 | Dinzi | 425/156 |
| 3,191,234 | 6/1965 | Hendry | 425/448 |
| 3,723,037 | 3/1973 | Formo | 425/244 X |

Primary Examiner—Robert B. Reeves
Assistant Examiner—David A. Scherbel
Attorney, Agent, or Firm—McNenny, Pearne, Gordon, Gail, Dickinson & Schiller

[57] ABSTRACT

A power-retractable feeder for an injection molding machine in which an actuator is adapted to forcibly seal a button-type outlet nozzle of the feeder against a side inlet port of a charging cylinder without developing an unbalanced lateral load on the cylinder. As disclosed, the reaction force developed on the actuator is transmitted to the side of the cylinder opposite the inlet. The actuator is selectively operable to retract the feeder nozzle from the cylinder for inspection, removal, maintenance, or the like. The disclosed feeder is of the screw type driven by a rotary motor through a coupler which isolates an axial reaction force on the screw from the motor. Also disclosed is a remote actuator and associated linkage for operating a shut-off valve in the feeder nozzle at either the extended or retracted position of the nozzle.

10 Claims, 5 Drawing Figures

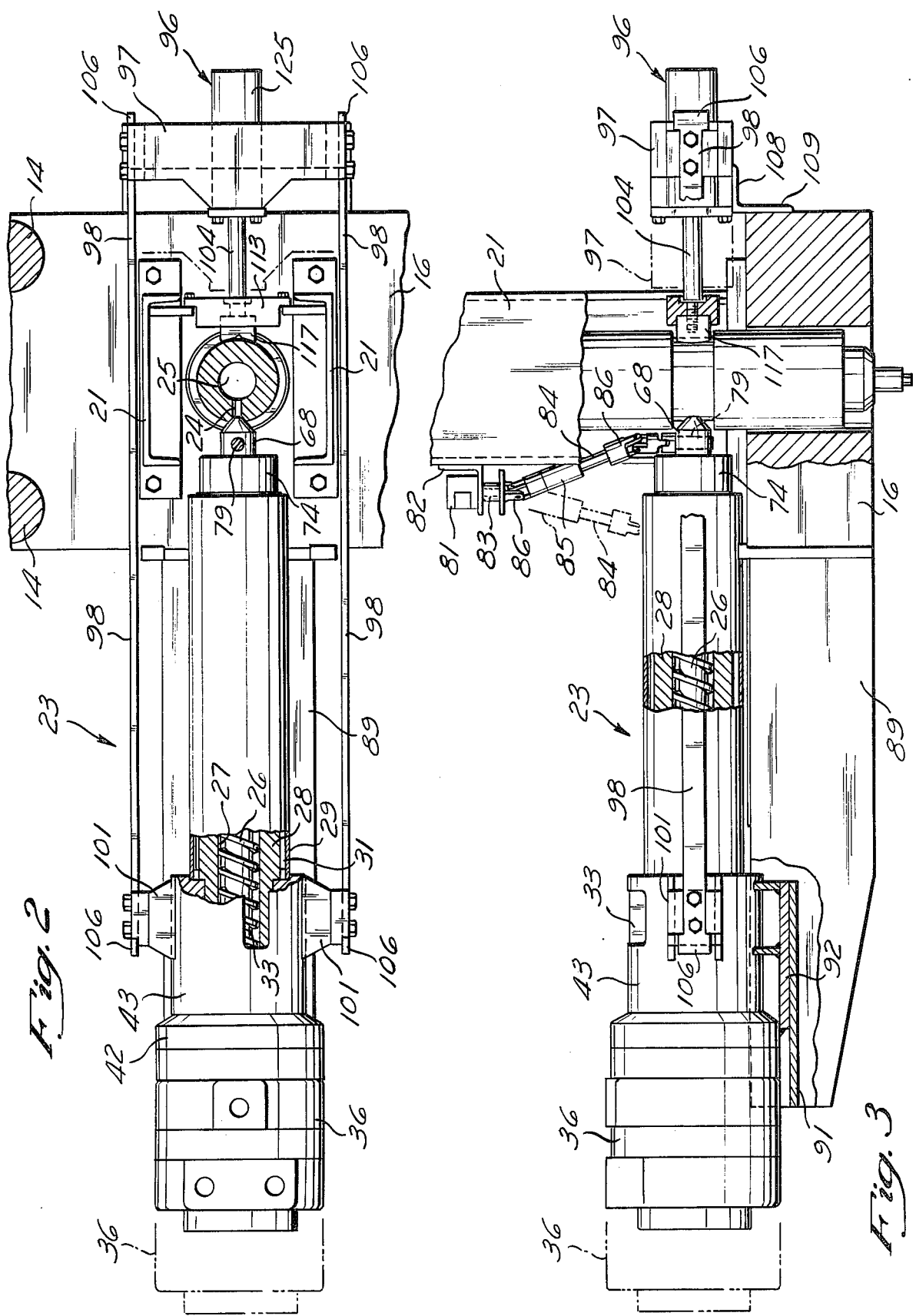

4,044,925

SCREW FEEDER FOR INJECTION MOLDING MACHINE

BACKGROUND OF THE INVENTION

The invention relates in general to material feeding devices, and more specifically to apparatus for feeding material to injection molding machines.

PRIOR ART

A primary application of the feeding apparatus of the present invention is in supplying material stock to the charging cylinder of a molding machine, such as a machine of the type shown in U.S. Pat. No. 3,194,868 to Shaw. Where used in this type of service, the feeder apparatus delivers thermoplasticized material under pressure to a side inlet of the charging cylinder. U.S. Pat. No. 2,493,805 illustrates one approach of introducing pressurized fluid to a charging chamber. A problem in this field is the need for a convenient manner of periodically disengaging and then reconnecting the feeder from the charging cylinder after intervals of operation, e.g., at the end of a work shift, when raw material is changed or when a production run is completed, and for reasons of inspection and maintenance of the feeding system. In the past, it has often been necessary for the purpose of separating a feeding apparatus from the charging chamber to manually disassemble various elements by a tedious process of unbolting or otherwise disconnecting various parts and later manually reassembling the parts.

SUMMARY OF THE INVENTION

The invention provides a power actuator for engaging and disengaging a material stock feeder from the charging cylinder of a molding machine. The power actuator is arranged to selectively clamp a nozzle of the stock feeder assembly into communication with a side port on the charging cylinder and, alternatively, to retract the feed nozzle a distance sufficient to afford full accessibility to the feed nozzle and charging cylinder area. The nozzle clamping and retracting actuator is advantageously arranged to avoid high, unbalanced, lateral and eccentric loading on the charging cylinder during engagement of the nozzle with the cylinder.

In the preferred embodiment, the feed nozzle is removably fixed on the stock feeder assembly and the feeder assembly is shifted relative to the charging cylinder to engage and disengage the nozzle. The feeder assembly is slidably disposed on a supporting member for movement in a direction radial to the charging cylinder. A pair of tension rods symmetrically spaced on opposite sides of the charging cylinder and extending generally parallel to the direction of movement are utilized to transmit the reaction force of the actuator, as it develops a nozzle-sealing force on one side of the charging cylinder, through a clamping block to the opposite side of the cylinder.

Another feature of the invention involves a remote power actuator and associated linkage for operation of a flow control valve in the nozzle. The remote actuator permits the flow control valve to be located immediately adjacent the outlet of the nozzle so that a minimum volume of material is contained in the nozzle beyond control of the valve. Further, the distant location of the actuator from the movable nozzle permits it to be advantageously fixedly mounted on the machine frame and located at a point at which it does not obstruct view or access to the nozzle area and at which it is readily serviced itself.

An additional feature of the invention relates to a drive system for rotating a screw of the feeding apparatus wherein a shaft coupler is adapted to transmit torque from a rotary drive motor to the screw while isolating the axial reaction load on the screw from the drive motor. A motor, ideally a hydraulically driven unit, is coaxially arranged with the screw to avoid side loading on the screw and its associated support bearings. Side loading has ordinarily been present in prior art arrangements in which the feed screw is driven by a worm. The coupler, moreover, is arranged to readily accommodate slight radial misalignment of the screw shaft and/or motor shaft, allowing an economical tolerance range in the manufacture and assembly of the related elements of the feeder apparatus.

BRIEF DESCRIPTION OF THE DRAWINGS

FIG. 2 is a plan view of the material feeding apparatus;

FIG. 3 is an elevational view of the material feeding apparatus illustrating the manner in which it is supported on the molding machine;

DESCRIPTION OF THE PREFERRED EMBODIMENT

Figure 1:
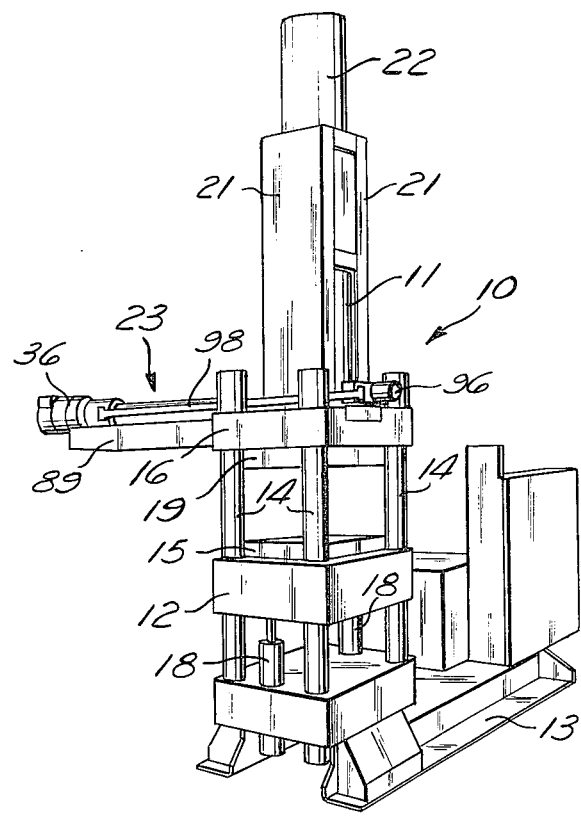
FIG. 1 is a perspective view of an injection molding machine on which is provided the material stock feeding apparatus of the invention.

There is shown in somewhat schematic form an injection molding machine 10 of the general type disclosed in the aforementioned U.S. Pat. No. 3,194,868, the disclosure of which is incorporated herein by reference. The machine 10 described herein is arranged in a vertical configuration with reference to the axis of a charging cylinder 11 and the direction of movement of a lower clamping unit 12, on which a bottom heating platen 15 is mounted.

The frame of the machine 10 includes a base weldment 13 supporting four vertically extending, spaced columns 14 on which the lower clamping unit 12 is vertically guided and on which an upper platform 16 carrying a top heating platen 19 is fixed. The clamping unit 12 is driven vertically by a pair of hydraulic cylinder actuators 18 for closing and opening mold sections (not shown) on the upper and lower heating platens 19 and 15.

The charging cylinder 11 is vertically disposed between a pair of spaced, vertical channels 21 carried on the upper platform 16. A plunger (not shown) driven by a hydraulic cylinder actuator 22 descends through a cylindrical chamber 25 of the cylinder 11 to inject a charge of plasticized molding material from the chamber into a mold cavity in a conventional manner.

A stock feeder apparatus, indicated generally at 23, is adapted to forcibly introduce plasticized material into the charging chamber 25 through a radial side port 24. The feeder apparatus 23 employs a feed screw 26 for delivering plsticized material under pressure to the chamber 25. The screw 26 operates in a cylindrical bore 27, arranged in a horizontal plane, such that the rotational axis of the screw 26 is radial to the vertical charging chamber 25 and in alignment with the port 24. A cylinder 28 in which the bore 27 is formed may be encircled by a jacket 29 to define a circumferential zone 31 around the cylinder, in which a fluid may be circulated for controlling the temperature of material in the feeder bore 27. Material in particulate, strip or other convenient form is supplied to the feed screw 26 through a feeder inlet 33 in a suitable conventional manner.

Figure 5:
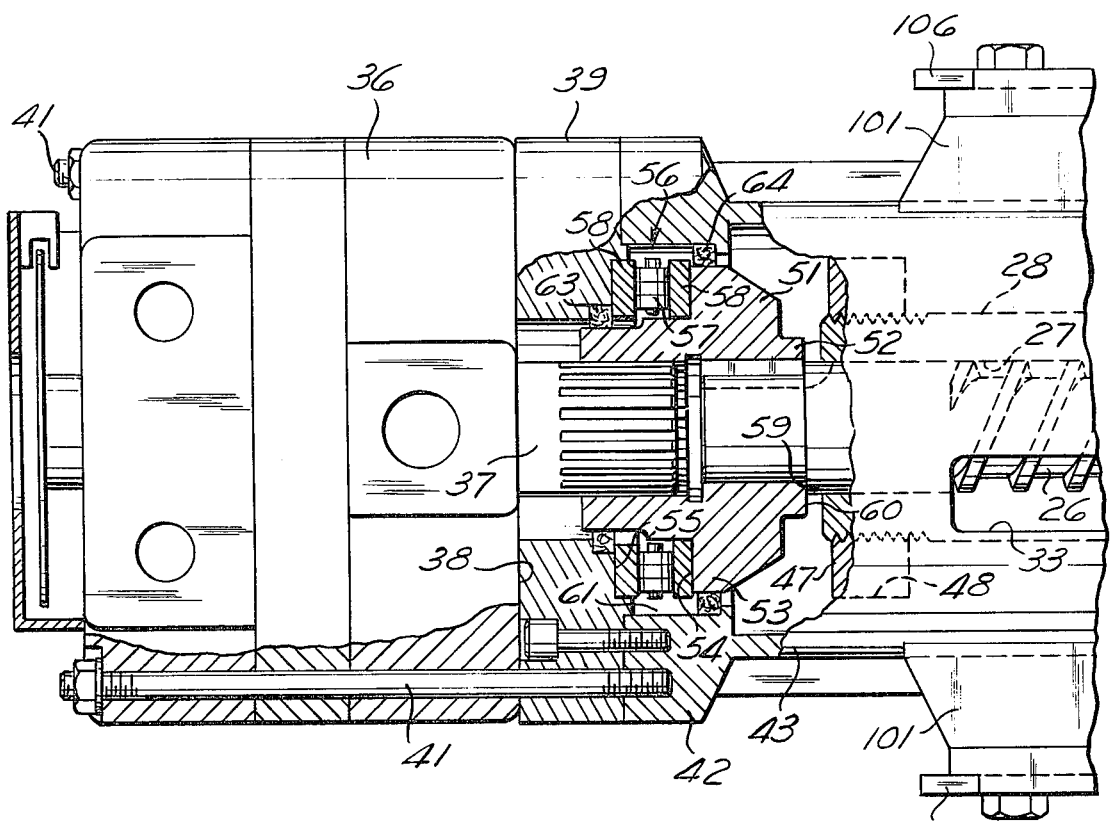
FIG. 5 is an enlarged plan view of the drive end of the screw feeder apparatus, with portions cut away to reveal details of a rotary coupling element of the invention.

With particular reference to FIG. 5, the feed screw 26 is rotatably driven by a rotary motor 36, preferably of a commercially available hydraulic type of suitable capacity. The motor 36 and other power actuators to be described are preferably driven by a suitable hydraulic pump and circuitry (not shown) on the frame 13. An output shaft 37 of the motor is coaxially aligned with the feed screw 26. A forward face 38 of the motor 36 is held in abutting contact with a retainer plate 39 by elongated, threaded studs 41. The retainer plate 39 is secured to an end flange 42 unitary with a circular feeder case 43. The case 43 is concentrically fixed on the outer end of the screw cylinder 28 by suitable means, such as a nut indicated at 47 removably threaded on the cylinder 28 and received in a counterbore 48 formed in the body of the case 43.

A shaft coupler 51 transmits torque from the output shaft 37 of the motor 36 to the screw end 52. The shaft coupler 51 includes an integral, relatively heavy peripheral flange 53 providing a rearwardly facing, radial abutment surface 54. The coupler 51 is internally splined or keyed at both of its ends to interengage with respective portions of the motor shaft 37 and screw shaft end 52 to provide a torque-transmitting relationship between these elements. A rearward reaction load developed on the screw 26 by pressurized material being fed through the bore 27 is transmitted to the coupler 51 by abutting engagement between a radial shoulder 59 of the screw and an opposing forward radial face 60 of the coupler.

This rearward load of the screw 26 developed on the coupler 51 is taken up by a thrust roller bearing assembly 56 of a commercially available type comprising a plurality of circumferentially spaced, radially aligned rollers 57 disposed between a pair of hardened steel washers 58 forming raceways for the rollers. As indicated, a forward one of the washers 58 abuts and axially supports the coupler flange surface 54, while the rearward washer is supported in a shallow counterbore 55 in the retainer plate 39.

It is thus seen, with suitable end clearance of the motor shaft 37 and end 52 of the screw 26 that the axial reaction force on the screw is isolated from the motor by the coupling 51. Radial clearance, designated generally at 61, is provided in the end case 43 to permit both the coupler 51 and bearing assembly 56 to find the true center of rotation of the screw shaft 26 and/or the motor shaft 37 to minimize undesirable forces and wear otherwise caused by misalignment of these elements. The bearing assembly 56 is isolated from the surrounding environments by a pair of resilient, circumferential seals 63,64 on either side of the bearing assembly and sealing against the outer surfaces of the coupler 51 and inner surfaces of the retainer plate 39 and end case 43, respectively.

Figure 4:
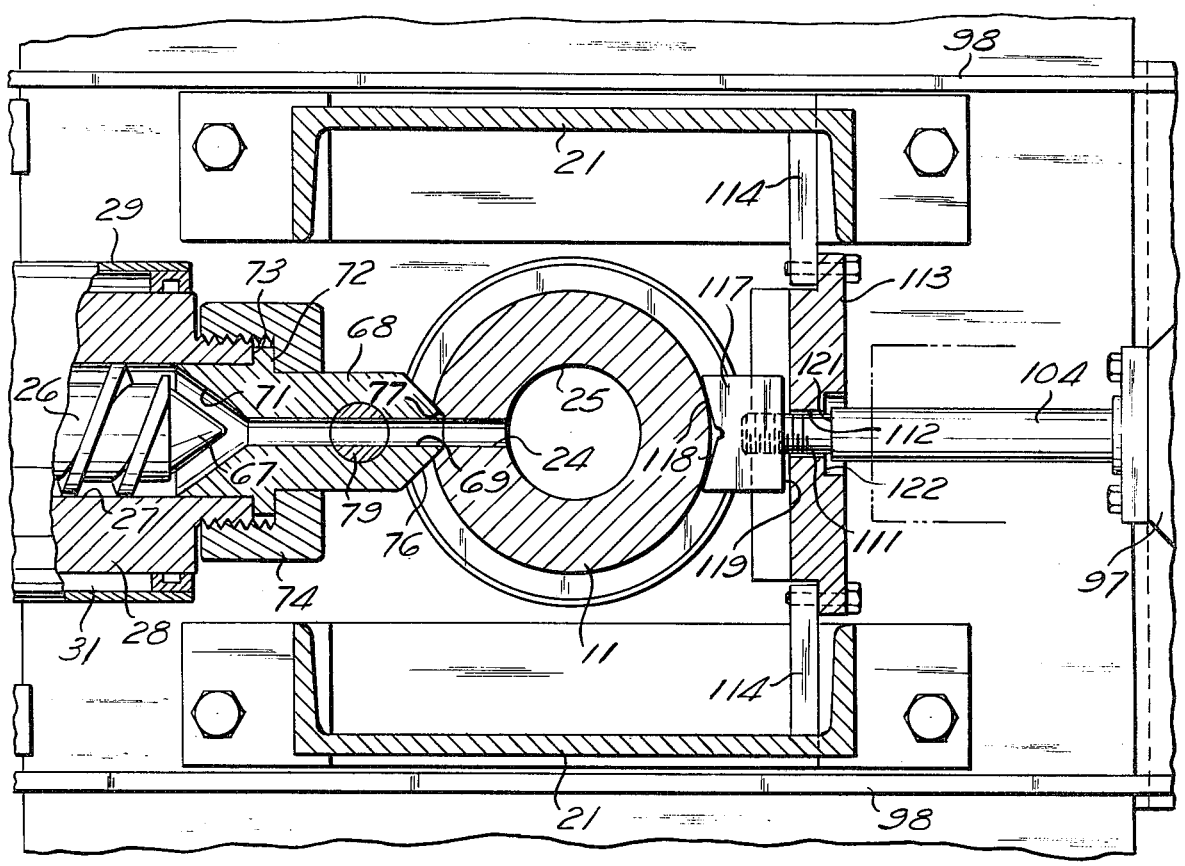
FIG. 4 is an enlarged, sectional view of the charging cylinder and nozzle of the feeding apparatus taken at a plane through a midpoint of the nozzle and transverse to the charging cylinder axis.

With attention directed to FIG. 4, the screw 26 at a forward end 67 forces plasticized material through an outlet nozzle 68 in communication with the side port 24. The button-type nozzle 68 is a generally circular body having a central interior passage 69 extending forwardly from a conical recess 71 disposed within the feed screw bore 27. The recess 71, in open communication with the feed screw bore 27, directs material received from the periphery of the screw 26 to the central nozzle passage 69. For purposes of retaining the nozzle 68 against the feed screw cylinder 28, an integral, external, peripheral flange 72 is held against an end face 73 of the cylinder by a nozzle retaining nut 74. As seen, the nut 74 is removably threaded on the cylinder 28. A forward end of the nozzle 68 is tapered at 76 to enable the nozzle to self-align and reliably seal with a similarly tapered or beveled entrance 77 formed on the outward end of the side port 24.

A valve 79 is provided in the nozzle passage 69 adjacent the nozzle end 76 is selectively operable to stop off flow of material from the feeder 23 by rotation through an angle of 90 degrees from that illustrated. The valve 79 is power-operated by a rotary actuator 82 (FIG. 3) fixed on the machine frame channels 21 by means of a horizontal angle bracket 82. Conveniently, the power actuator 81 is a hydraulically operated, commercially available unit of the type having an output shaft 83 adapted to rotate through an angle limited to 90 degrees as established by the valve 79. The output shaft 83 is coupled to the valve 79 by a telescoping shaft 84 and sleeve 85, terminated at each of their respective ends by universal couplings 86. The shaft 84 has an acircular cross section, while the sleeve 85 has a complementary bore enabling the shaft and sleeve to change their effective combined length while still transmitting torque, so that the valve 79 may be operated through the shaft and sleeve in distinct positions of the feeder 23 discussed below.

As shown in FIG. 3, the material stock feeder apparatus 23 is supported on a horizontal extension 89 fixed to the upper platform 16. The platform extension 89 includes a horizontal bed plate 91 at its distal end, on which the feeder 23 is slidably disposed by means of a shoe plate 92 fixed to the lower side of the feeder case 43 and slidable horizontally over the upper surface of the bed plate.

The feeder apparatus 23 is extended into engagement with the charging chamber port 24 or retracted therefrom upon selective operation of a hydraulic piston and cylinder actuator 96 of the double-acting type disposed on a side of a charging cylinder 11 opposite that of the feeder apparatus. The power actuator 96 is bolted or otherwise fixed to a horizontal yoke or cross bracket 97. The yoke 97 is connected to the feeder assembly 23 by a pair of parallel tension rods 98. The rods 98 are bolted to laterally extending brackets 101 fixed to the feeder case 43. The brackets 101 and yoke 97 are suitably dimensioned to maintain a spacing between the parallel rods 98 sufficient to clear the outer faces of the machine frame channels 21. As may be understood from FIGS. 2 and 3, the axis of a piston rod 104 of the feeder shifting actuator 96 is coaxially arranged with respect to the feed screw 26.

Further, the tension rods 98 are disposed in the horizontal plane of the mutual axis of the feeder 23 and actuator 96, and are equally spaced in a symmetrical manner with respect to this axis. All of the ends of the tension rods 98 are provided with a tee-flange 106 and are disposed within suitable slots in the yoke 97 and brackets 101 to prevent relative axial movement between the rods and these slotted elements under high tension loads in the rods. The actuator 96 is supported through the yoke 97 on a horizontal leg 108 of an angle bracket 109 secured to the upper platform 16. It will be understood that the bracket leg 108 vertically supports the actuator 96, but allows limited sliding movement of the yoke 97 and actuator in a horizontal plane.

With specific reference to FIG. 4, the piston rod 104 has a threaded reduced diameter end portion 111 passing through a clearance bore 112 formed in a stationary cross bar bolted to elements 114 fixed to the machine frame. The reduced diameter rod portion 111 is threaded into a clamping block 117 having planar surfaces 118 forming a wide angle V in the view of FIG. 4 and adapted to engage the charging cylinder 11.

As revealed in FIG. 4, when the clamp surfaces 118 are in engagement with the charging cylinder 11, a rear force 119 of the clamp is spaced inwardly from the crossbar 113 and a radial piston rod shoulder 121 is likewise spaced away from an adjacent radial surface 122 of a counterbore associated with the rod clearance bore 112. As will be understood, this arrangement of clearance between these elements provides a limited degree of freedom of movement for the clamping block 117 and actuator 104. This limited degree of freedom of movement assures that the clamping force developed by the actuator 96 is imposed exclusively on the charging cylinder 11 without significant unbalanced lateral loads.

To retract the feeder assembly 23 from the illustrated position, the actuator 96 is energized to draw the piston rod 104 into the cylinder body, designated 125, of the actuator. Initial retraction of the rod 104 causes the clamping block 117 to move out of contact with the charging cylinder 11 until the rear face 119 of the block abuts the crossbar 113, it being assumed that there is less frictional drag of the yoke 97 on the support 108 than that between the shoe plate 92 of the feeder on the bed 91. Since further movement of the block 117 is restricted by the bar 113, the actuator cylinder body 125 is drawn over the piston rod 104 leftwardly, as viewed in the figures, towards the charging cylinder 11. Corresponding movement of the yoke 97 moves the tension rods 98 leftwardly, and in turn simultaneously retracts the feeder apparatus 23 away from the charging cylinder 11. As indicated previously, the feeder apparatus 23 slides on its shoe plate 92 across the bed 91 of the horizontal platform extension 89 (FIG. 3) with the retracted position of the feeder 23 being indicated by the phantom outlines of the rotary actuator 36 and yoke 97 in FIGS. 2 and 3. The degree of movement of the nozzle 68 can also be seen in FIG. 3 by the phantom position of the rotary actuator sleeve and shaft 85 and 84. In such a retracted position, the nozzle may be readily inspected, removed, or otherwise attended to, and full visual and physical access to the injection cylinder area are provided.

During retraction of the feeder apparatus 23, the rods 98 are under a compression load, well below a level to cause buckling, proportionate to the frictional drag of the shoe 92 on the bed plate 91. To return the feeder apparatus 23 to the illustrated position, the piston rod 104 is extended from the cylinder body 125 of the actuator 96. Initial movement of the piston rod 104 causes the block 117 to engage the charging cylinder 11.

Further extension of the piston rod 104 from the actuator cylinder body 125 causes the body, and therefore the yoke 97, to move rightwardly from the phantom line position of FIGS. 2 through 4 to the full line position. During this movement, a relatively low and generally negligible lateral load is applied to the charging cylinder 11 by the block 117 to overcome frictional drag of the shoe plate 92 on the bed 91. It will be understood that in this advancing mode, and during actual clamping of the nozzle 68 on the charging cylinder 11, the elongated rods 98 are in tension. Upon engagement of the nozzle 68 with the beveled entrance 77 to the charging cylinder side port 24 and application of a rightwardly directed sealed force by the actuator 96 (as viewed in the FIGURES), a leftward reaction force of equal magnitude is sustained by the actuator piston rod 104 and is transmitted through the clamping block 117 to the left side of the cylinder 11, thereby effectively eliminating any net lateral load on the cylinder. The magnitude of the counteropposing nozzle and clamp lock forces, of course, is determined by the force output of the actuator 97 as desired to adequately seal the nozzle 68 and port surface 77 with sufficient contact pressure.

Although a preferred embodiment of this invention is illustrated, it should be understood that various modifications and rearrangements of parts may be resorted to without departing from the scope of the invention disclosed and claimed herein.

What is claimed is:

1. In an injection molding machine having a frame, a charging cylinder mounted on the frame including an internal charging chamber and an inlet port on the cylinder communicating with the charging chamber, the combination of a material stock feeder adapted to supply plasticized material to the charging chamber inlet, power actuator means for selectively moving an outlet of the material stock feeder into communication with the inlet of the charging chamber and alternately away from the inlet to automatically afford access to both the outlet and inlet, said power actuator means being constructed and arranged to develop fluidtight communication between said outlet and inlet while avoiding substantial unbalanced loading on the charging cylinder.

2. An injection molding machine as set forth in claim 1, wherein the charging cylinder inlet is disposed on a radial side of the charging cylinder, said outlet comprising a nozzle adapted to seal against said inlet by surface contact pressure therewith, said actuator being arranged to develop a force to produce said sealing contact pressure and being arranged to move said nozzle along a line radial to said charging cylinder.

3. An injection molding machine as set forth in claim 2, wherein said actuator is operatively connected to a clamping block disposed on a side of the charging cylinder opposite said nozzle, said actuator being operatively connected to said block and said feeder nozzle in a manner such that the reaction load developed by the actuator in opposition to the nozzle sealing force is transferred to the charging cylinder through said clamping block.

4. An injection molding machine as set forth in claim 3, including means for supporting said block for movement radial to said charging cylinder, and means for limiting radial movement of said clamping block to a relatively small distance substantially less than the distance of movement of said nozzle from said charging cylinder developed by said actuator, said limited radial movement of said clamping block permitting said block and said nozzle to self-align to the actual lateral position of the charging cylinder in the machine without introducing substantial unbalanced lateral loads on said cylinder.

5. An injection molding machine as set forth in claim 4, wherein said actuator is a double-acting hydraulic piston cylinder actuator.

6. An injection molding machine as set forth in claim 4, wherein said actuator is arranged to apply said sealing force along a line coaxial with a radial line of movement of said nozzle.

7. An injection molding machine as set forth in claim 6, wherein said nozzle is removably fixed to said feeder, means supporting said feeder for radial movement with said nozzle, said feeder including a material stock pressurizing zone communicating with said nozzle.

8. An injection molding machine as set forth in claim 7, including a shut-off valve intermediate said pressurizing zone and a forward end of said nozzle, selectively operable power valve actuator means for opening and closing said shut-off valve, said valve actuator means being supported on said machine independently and remotely of said feeder and said nozzle, and means interconnecting said valve actuator means and said shut-off valve and being capable of transmitting opening and closing movement developed by said valve actuator means to said shut-off valve means in both extended and retracted positions of said nozzle.

9. In an injection molding machine having a frame, a charging cylinder mounted on the frame, said charging cylinder including an internal charging chamber and a radial inlet port on one side of the cylinder communicating with the chamber, a feeder having means for pressurizing plasticized material stock and a nozzle for delivering the pressurized material stock to said inlet, said nozzle being adapted to engage said intet and form a seal therewith, power actuator means for selectively displacing said feeder radially with respect to said cylinder between extended and retracted positions at which said nozzle and inlet are respectively in engagement or separated sufficiently to provide access to said nozzle, said actuator having two parts adapted to forcibly move relative to one another, a clamping block disposed on a side of the cylinder opposite said inlet, said actuator having one of its relatively moving parts fixed to one of said feeder or clamping block units, tensioning means fixed at one side thereof to the other of said units extending in straddling relationship to said cylinder and fixed at the opposite side thereof to the other of said parts of said actuator.

10. An injection molding machine as set forth in claim 9, including means for supporting said clamping block for movement along a direction radial to said cylinder, and means for limiting movement of said clamping block away from said cylinder under the influence of said actuator to a distance substantially less than the distance of movement of said feeder between said extended and retracted positions as developed by said actuator, whereby said nozzle and said clamping block are self-aligning to said cylinder when said nozzle is in said extended position.

* * * * *

UNITED STATES PATENT AND TRADEMARK OFFICE
CERTIFICATE OF CORRECTION

PATENT NO. : 4,044,925
DATED : August 30th, 1977
INVENTOR(S) : James R. Mercer

It is certified that error appears in the above-identified patent and that said Letters Patent are hereby corrected as shown below:

Column 2, line 68, "plsticized" should read --plasticized--.

Column 4, line 23, "82" should read --81--.

Column 5, line 20, "force" should read --face--.

Column 8, line 4, "intet" should read --inlet--.

Signed and Sealed this

Twentieth Day of December 1977

[SEAL]

Attest:

RUTH C. MASON
Attesting Officer

LUTRELLE F. PARKER
Acting Commissioner of Patents and Trademarks